United States Patent
Maeda (10) Patent No.: US 9,965,148 B2
(45) Date of Patent: May 8, 2018

(54) UNIT MANIPULATION SYSTEM, AND SLAVE DISPLAY DEVICE AND MASTER DISPLAY DEVICE USED IN THE SYSTEM

(71) Applicant: DENSO CORPORATION, Kariya, Aichi-pref. (JP)

(72) Inventor: Masahito Maeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 328 days.

(21) Appl. No.: 14/430,973

(22) PCT Filed: Sep. 26, 2013

(86) PCT No.: PCT/JP2013/005697
§ 371 (c)(1),
(2) Date: Mar. 25, 2015

(87) PCT Pub. No.: WO2014/054247
PCT Pub. Date: Apr. 10, 2014

(65) Prior Publication Data
US 2015/0253938 A1 Sep. 10, 2015

(30) Foreign Application Priority Data
Oct. 1, 2012 (JP) .................................. 2012-219530

(51) Int. Cl.
*G06F 3/0484* (2013.01)
*G06F 3/0482* (2013.01)
(Continued)

(52) U.S. Cl.
CPC ............ *G06F 3/0482* (2013.01); *B60K 35/00* (2013.01); *B60K 37/06* (2013.01);
(Continued)

(58) Field of Classification Search
CPC combination set(s) only.
See application file for complete search history.

(56) References Cited

U.S. PATENT DOCUMENTS 6,182,171 B1 * 1/2001 Akatsuka .......... H04L 12/40032
701/1
6,968,510 B2 * 11/2005 Yokota ............... G01C 21/3611
715/805
(Continued)

FOREIGN PATENT DOCUMENTS

JP 2004-037294 A 2/2004
JP 2005-351868 A 12/2005
(Continued)

OTHER PUBLICATIONS

Office Action dated Sep. 29, 2015 in the corresponding JP application No. 2012-219530 (with English translation).
(Continued)

*Primary Examiner* — Namitha Pillai
(74) *Attorney, Agent, or Firm* — Posz Law Group, PLC (57) ABSTRACT

A unit manipulation system includes: a master display device having a terminal function for manipulating a unit; and a slave display device that establishes data communication with the master display device, and calls the terminal function of the master display device, to enable manipulation of the unit from a manipulation section through the master display device. The slave display device includes: a call menu display section that displays a call menu for calling the terminal function; and a manipulation screen display section that, when the call menu displayed by the call menu display section is selected, calls the terminal function of the master display device, and causes a display section to display a manipulation screen corresponding to the call menu. The master display device and the slave display device are coordinated with each other to enable the slave display device to perform various manipulations through the master display device.

18 Claims, 7 Drawing Sheets

(51) Int. Cl.
*G06F 3/14* (2006.01)
*B60K 35/00* (2006.01)
*B60K 37/06* (2006.01)

(52) U.S. Cl.
CPC ........ *G06F 3/04842* (2013.01); *G06F 3/1438* (2013.01); *B60K 2350/1032* (2013.01); *G09G 2360/06* (2013.01); *G09G 2370/04* (2013.01); *G09G 2380/10* (2013.01)

(56) References Cited

U.S. PATENT DOCUMENTS

| | | | |
|---|---|---|---|
| 8,953,799 B2* | 2/2015 | Klassen | G06F 21/305 380/250 |
| 2011/0066971 A1 | 3/2011 | Forutanpour et al. | |

FOREIGN PATENT DOCUMENTS

| | | |
|---|---|---|
| JP | 2006-103450 A | 4/2006 |
| JP | 2006-318329 A | 11/2006 |
| JP | 2007-118626 A | 5/2007 |
| JP | 2009-089235 A | 4/2009 |

OTHER PUBLICATIONS

International Search Report and Written Opinion of the International Searching Authority dated Jan. 7, 2014 in the corresponding International application No. PCT/JP2013/005697 (and English translation).

* cited by examiner

UNIT MANIPULATION SYSTEM, AND SLAVE DISPLAY DEVICE AND MASTER DISPLAY DEVICE USED IN THE SYSTEM

CROSS REFERENCE TO RELATED APPLICATION

This application is a U.S. national stage of International Application No. PCT/JP2013/005697 filed on Sep. 26, 2013 and is based on Japanese Patent Application No. 2012-219530 filed on Oct. 1, 2012, the disclosures of which are incorporated herein by reference.

TECHNICAL FIELD

The present disclosure relates to a unit manipulation system mounted, for instance, in a vehicle, and to a slave display device and master display device used in the unit manipulation system.

BACKGROUND ART

In recent years, it is not uncommon to see that a plurality of display devices is mounted in a vehicle. In some cases, for example, the vehicle has a rear-seat display device for providing information to a passenger in a rear seat in addition to a front-seat display device for providing information to a driver of the vehicle and to a passenger in a front passenger seat.

In general, a display device on an instrument panel (dashboard) is referred to as a master display device, and an additional display device is referred to as a slave display device. In this instance, the master display device also functions as an information terminal that permits the driver to manipulate a navigation device and an audio device. The slave display device, on the other hand, is defined as a simple monitor that displays TV content or DVD content transmitted from the master display device.

Consequently, if the passenger in the rear seat wants to manipulate, for instance, the audio device, the passenger in the rear seat has to ask the driver or the passenger in the front passenger seat to manipulate the master display device. Although a remote control terminal is available to remote control the master display device, it is difficult for the passenger in the rear seat to view a manipulation screen of the master display device.

A technology proposed, for instance, in Patent Literature 1 permits the registration of an original menu that makes it easy to manipulate a rear monitor, which acts as the slave display device, from a front monitor, which acts as the master display device.

However, the technology described in Patent Literature 1 mainly relates to the manipulation of the front monitor and does not propose to provide the passenger in the rear seat with increased ease of manipulation. Further, the rear monitor described in Patent Literature 1 merely displays information provided by an AV device.

PRIOR ART LITERATURE

Patent Literature

Patent Literature 1: JP 2006-103450 A

SUMMARY OF INVENTION

The present disclosure has been made in view of the above circumstances. An object of the present disclosure is to provide a unit manipulation system that enables a master display device and a slave display device to coordinate with each other and permits various manipulations from the slave display device through the master display device. Another object of the present disclosure is to provide a slave display device and a master display device to be used in the unit manipulation system.

According to a first aspect of the present disclosure, there is provided a unit manipulation system that includes a master display device and a slave display device. The master display device has a terminal function for manipulating at least one unit. The unit may be, for example, a navigation unit having navigation functions, an AV unit having audio functions, or a communication unit having communication functions.

The slave display device establishes data communication with the master display device and calls the terminal function of the master display device to enable manipulation of the unit from a manipulation section through the master display device.

The slave display device includes a call menu display section and a manipulation screen display section. The call menu display section displays a call menu for calling the terminal function. When a call menu displayed by the call menu display section is selected, the manipulation screen display section calls the terminal function of the master display device and causes a display section to display a manipulation screen corresponding to the call menu.

In the slave display device, the call menu display section displays a call menu for calling the terminal function. When a call menu displayed by the call menu display section is selected, the manipulation screen display section calls the terminal function of the master display device and causes the display section to display the manipulation screen corresponding to the call menu.

Consequently, in the slave display device, it is possible to manipulate the unit in accordance with the manipulation screen of the display section. This enables the master display device and the slave display device to coordinate with each other and permits various manipulations from the slave display device through the master display device.

According to a second aspect of the present disclosure, there is provided a slave display device having a manipulation section and a display section. The slave display device establishes data communication with a master display device having a terminal function for manipulating at least one unit, and calls the terminal function of the master display device to enable manipulate of the unit from the manipulation section through the master display device. The slave display device includes a call menu display section and a manipulation screen display section. The call menu display section displays a call menu for calling the terminal function. When a call menu displayed by the call menu display section is selected, the manipulation screen display section calls the terminal function of the master display device and causes a display section to display a manipulation screen corresponding to the call menu. This makes it possible to obtain the same advantageous effect as described earlier.

According to a third aspect of the present disclosure, there is provided a master display device having a terminal function for manipulating at least one unit. The master display device is used with a slave display device that establishes data communication with the master display device and calls the terminal function of the master display device enable manipulation of the unit from a manipulation section through the master display device. The slave display device includes a call menu display section and a manipulation screen display section. The call menu display section displays a call menu for calling the terminal function. When a call menu displayed by the call menu display section is selected, the manipulation screen display section calls the terminal function of the master display device and causes a display section to display a manipulation screen corresponding to the call menu. The master display device includes a registration menu display section and a determination section. The registration menu display section displays a registration target menu that can be registered as a call menu. When a registration target menu displayed by the registration menu display section is selected, the determination section determines the selected registration target menu as the call menu. This makes it possible to obtain the same advantageous effect as described earlier.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

An embodiment of the present disclosure will now be described with reference to the accompanying drawings.

The embodiment of the present disclosure is described below in accordance with the accompanying drawings.

Figure 1:
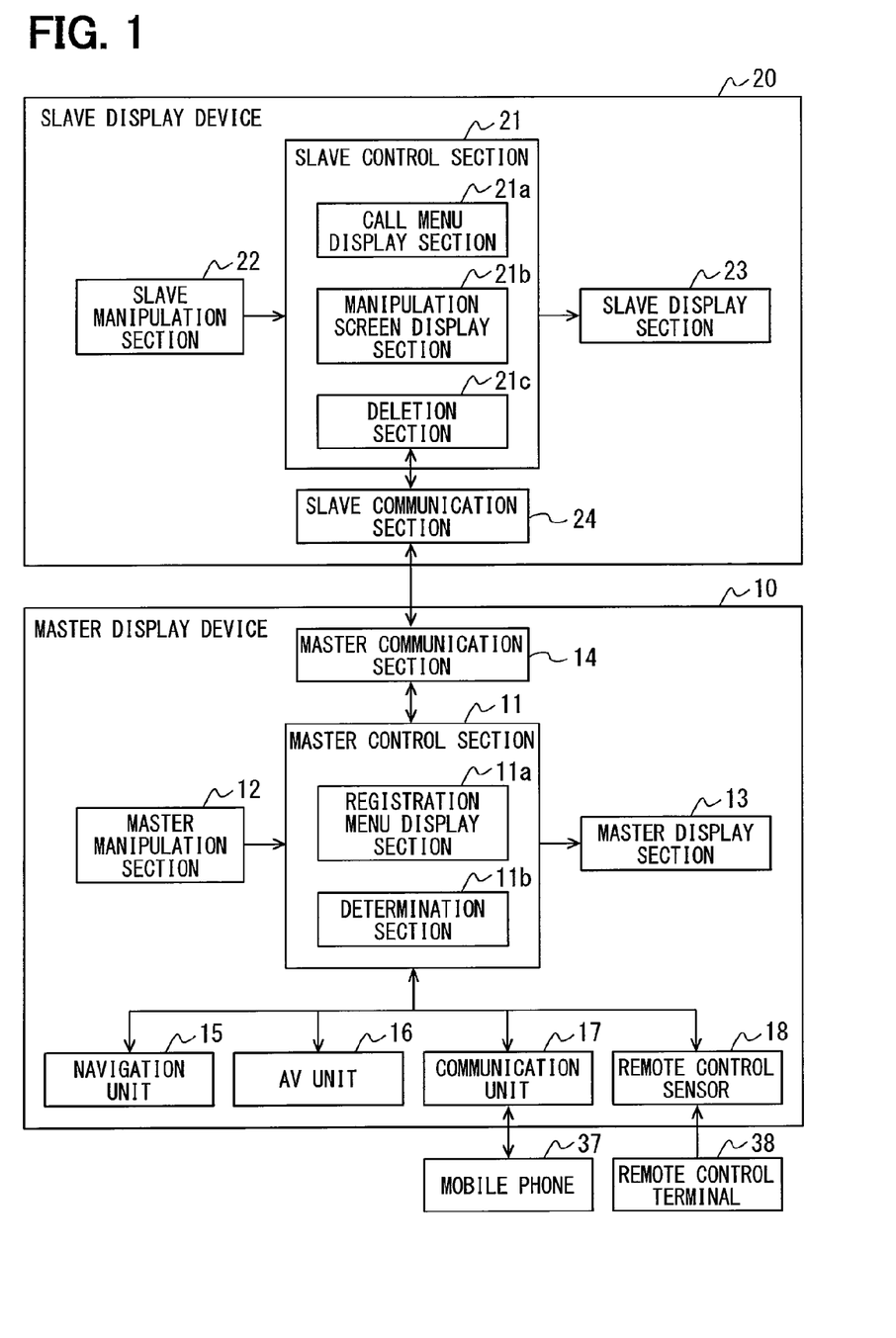
FIG. 1 is a schematic block diagram illustrating a configuration of a unit manipulation system according to an embodiment of the present disclosure.

A unit manipulation system shown in FIG. 1 includes a master display device 10 and a slave display device 20.

The master display device 10 is mainly formed of a master control section 11. The master control section 11 is configured as a so-called computer system that includes a CPU, a ROM, a RAM, an I/O, and a bus line connecting these components.

The master control section 11 is connected to a master manipulation section 12, a master display section 13, a master communication section 14, a navigation unit 15, an AV unit 16, a communication unit 17, and a remote control sensor 18.

The master manipulation section 12 is configured to input various instructions from a user and is embodied as a touch panel that is integral with the master display section 13.

The master display section 13 is configured to display various items of information, such as audio information and a map for navigation. Specifically, the master display section 13 is formed of a display, such as a liquid-crystal display.

The master communication section 14 is configured to establish data communication with the slave display device 20. The data communication to be established may be wired communication or wireless communication.

The navigation unit 15 performs navigation functions. The navigation functions include a map display function, a destination search function, a route search function, and a route guidance function.

The AV unit 16 performs audio functions. The audio functions include a function of recording from a CD, a song name search function, and a music playback function.

The communication unit 17 communicates with the outside through a mobile phone 37. Specifically, the communication unit 17 establishes data communication through a network or the like to receive news and other information.

The remote control sensor 18 receives an infrared signal from a remote control terminal (hereinafter referred to as the remote controller) 38. Consequently, the remote controller 38 can be used to remote control the master display device 10.

The slave display device 20, on the other hand, is mainly formed of a slave control section 21. The slave control section 21 is configured as a so-called computer system, as is the case with the master control section 11.

The slave control section 21 is connected to a slave manipulation section 22, a slave display section 23, and a slave communication section 24.

Similarly to the master manipulation section 12, the slave manipulation section 22 is configured to input various instructions from the user and is embodied as a touch panel that is integral with the slave display section 23.

Similarly to the master display section 13, the slave display section 23 is configured to display various items of information, such as audio information and a map for navigation. Specifically, the slave display section 23 is formed of a display, such as a liquid-crystal display.

The slave communication section 24 is configured to establish data communication with the master display device 10. More specifically, the slave communication section 24 establishes data communication with the master communication section 14 of the master display device 10. Obviously, the data communication to be established may be wired communication or wireless communication.

FIG. 1 shows a state where only one slave display device 20 is connected. However, two or more slave display devices 20 may be connected.

A conventional slave display device is defined as a monitor that plays back TV content and DVD content transmitted from a master display device. In the present embodiment, however, functions of the master display device 10 can be called from the slave display device 20. A later-described registration process is performed so that a shortcut button for calling a predetermined function of the master display device 10 is registered in the slave display device 20.

The registration process will now be described with reference to the flowchart of FIG. 2. The registration process is performed by the master control section 11 of the master display device 10 when a menu is displayed to permit shortcut registration in the slave display device 20.

Figure 3A:
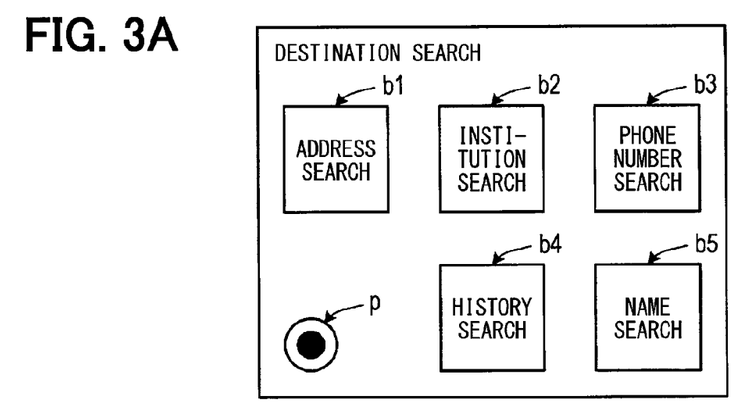
FIG. 3A is an explanatory diagram illustrating an example of a screen used in the registration process.

Firstly, in S100, it is determined whether or not a registration switch is pressed. As shown, for instance, in FIG. 3A, when a menu to permit shortcut registration is displayed, the registration process is performed. FIG. 3A shows a menu displayed for a destination search. Displayed in the menu are an address search button designated by the symbol b1, an institution search button designated by the symbol b2, a phone number search button designated by the symbol b3, a history search button designated by the symbol b4, and a name (Japanese syllabary) search button designated by the symbol b5. In addition, a petit button switch (designated by the symbol p), which is a relatively small button, is displayed in the menu as the registration switch. When a shortcut button is to be registered in the slave display device 20, the user presses the registration switch. When it is determined that the registration switch is pressed (S100: YES), the process proceeds to S110. When, on the other hand, it is determined that the registration switch is not pressed (S100: NO), the registration process is terminated without performing subsequent processing.

In S110, it is determined whether there are two or more slave display devices 20. The reason is that the master display device 10 is not always connected to only one slave display device 20, as mentioned earlier. When it is determined that there are two or more slave display devices 20 (S110: YES), the process proceeds to S120. When, on the other hand, it is determined that the number of the slave display devices 20 is not two or more (S110: NO), that is, when there is only one slave display device 20, the process skips S120 and S130 and proceeds to S140.

Figure 3B:
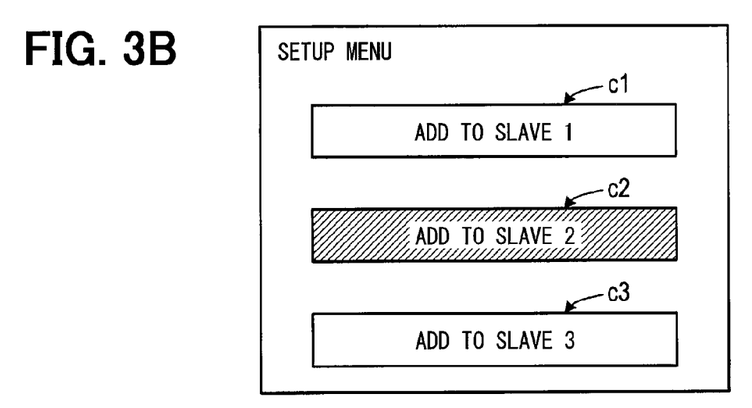
FIG. 3B is an explanatory diagram illustrating an example of a screen used in the registration process.

In S120, the plurality of the slave display devices 20 are displayed in a list, for instance, in FIG. 3B. Here, the slave display devices 20 are listed in the form of a setup menu. The setup menu shows a plurality of buttons, namely, an "Add to Slave 1" button designated by the symbol c1, an "Add to Slave 2" button designated by the symbol c2, and an "Add to Slave 3" button designated by the symbol c3. In this instance, the "Add to Slave 2" button designated by the symbol c2 is grayed out and not selectable (the button is hatched to indicate that it is grayed out; this rule applies hereinafter). Therefore, the user selects either the "Add to Slave 1" button designated by the symbol c1 or the "Add to Slave 3" button designated by the symbol c3.

Next, in S130, it is determined whether a listing is selected. When, for example, the "Add to Slave 1" button or the "Add to Slave 3" button is touched, an affirmative determination is made. When it is determined that a listing is selected (S130: YES), the process proceeds to S140. When, on the other hand, no listing is selected (S130: NO), the process of S120 and after are repeated.

In S140, registerable items are searched for. In the example of FIG. 3A, for instance, a registerable item is searched for from the menu showing the address search button designated by the symbol b1, the institution search button designated by the symbol b2, the phone number search button designated by the symbol b3, the history search button designated by the symbol b4, and the name (Japanese syllabary) search button designated by the symbol b5. It is conceivable that a registerable item is an item whose shortcut is not yet registered.

Figure 3C:
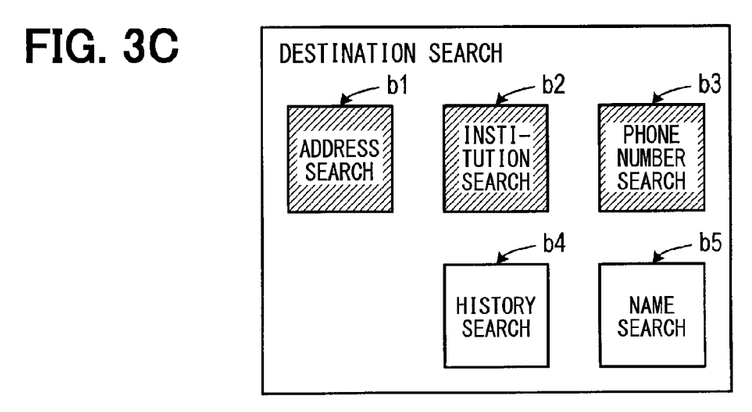
FIG. 3C is an explanatory diagram illustrating an example of a screen used in the registration process.

Next, in S150, the buttons are displayed, as shown, for instance, in FIG. 3C. Here, three buttons, namely, the address search button designated by the symbol b1, the institution search button designated by the symbol b2, and the phone number search button designated by the symbol b3, are grayed out and not selectable. Meanwhile, the history search button designated by the symbol b4 and the name (Japanese syllabary) search button designated by the symbol b5 are not grayed out, and are displayed brightly to be selectable. In this instance, therefore, the user selects either the history search button designated by the symbol b4 or the name (Japanese syllabary) search button designated by the symbol b5.

Next, in S160, it is determined whether a menu selection is made. In this process, an affirmative determination is made when, in the example of FIG. 3C, the history search button designated by the symbol b4 or the name (Japanese syllabary) search button designated by the symbol b5 is selected. When it is determined in S160 that a menu selection is made (S160: YES), the process proceeds to S170. When, on the other hand, it is determined that no menu selection is made (S160: NO), the determination process in S160 is repeated.

Figure 4A:
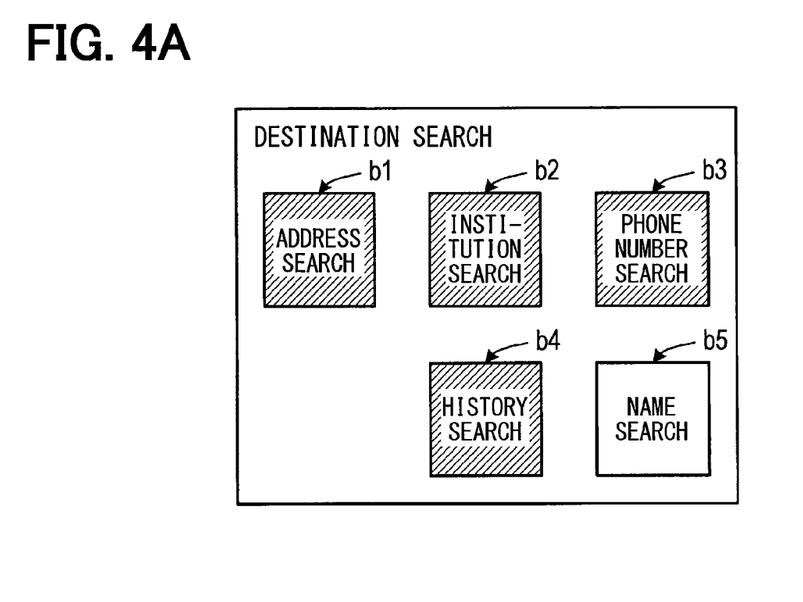
FIG. 4A is an explanatory diagram illustrating an example of a screen used in the registration process.

In S170, the display of the buttons is updated. When, for instance, the history search button designated by the symbol b4 is selected from the example of FIG. 3C, the history search button is grayed out and made unselectable as shown in FIG. 4A.

Figure 4B:
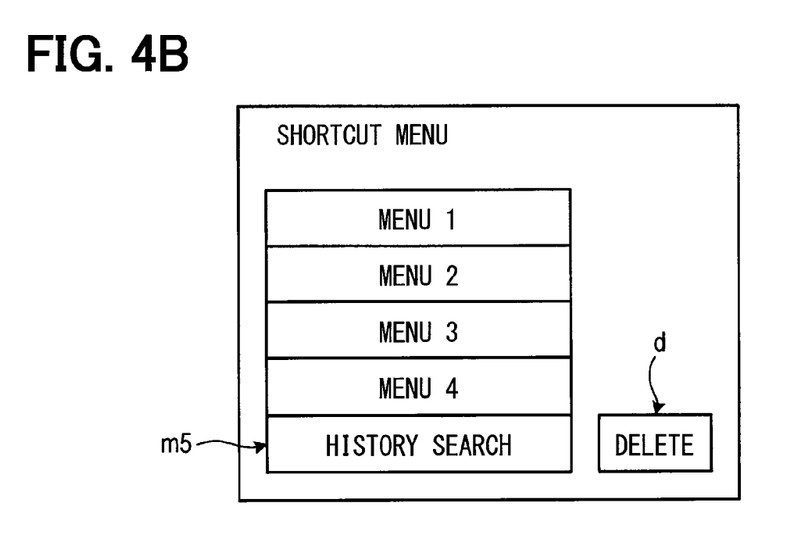
FIG. 4B is an explanatory diagram illustrating an example of a screen used in the registration process.

Next, in S180, information is transmitted. In this process, the information is transmitted to the slave control section 21 of the slave display device 20 through the master communication section 14 and the slave communication section 24 in order to indicate that the history search button is selected. A shortcut menu shown, for instance, in FIG. 4B is then displayed on the slave display section 23 of the slave display device 20. More specifically, a history search menu designated by the symbol m5 is added to the shortcut menu as one item of the menu.

A menu manipulation process, which is performed to manipulate the shortcut menu registered in the slave display device 20, will now be described with reference to the flowchart of FIG. 5. The menu manipulation process is performed by the slave control section 21 each time the user wants to manipulate the shortcut menu and performs a predetermined manipulation.

Firstly, in S200, one menu item from the shortcut menu is acquired as a processing target.

Next, in S210, the use of a function corresponding to the menu item acquired in S200 is detected. In S210, the process is performed to determine whether the function of the acquired menu item is used in the master display device 10. More specifically, the master control section 11 of the master display device 10 is inquired about the use of the function.

Next, in S220, it is determined whether the function is being used in the master display device 10 and non-sharable on the basis of the result of detection in S210. A memorized table is referenced to determine whether the function is non-sharable. When it is determined in S220 that the function is being used and non-sharable (S220: YES), the associated menu item is grayed out and is not selectable in S230, and then the process proceeds to S250. When, on the other hand, it is determined that the function is not being used or is sharable (S220: NO), the associated menu item is displayed brightly and made selectable in S240, and then the process proceeds to S250.

In S250, it is determined whether there is any unprocessed menu item in the shortcut menu. When it is determined in S250 that there is an unprocessed menu item (S250: YES), the processing of S200 and after are repeated. When, on the other hand, all menu items are processed (S250: NO), the process proceeds to S260.

In S260, it is determined whether a menu item is selected. When it is determined in S260 that a menu item is selected (S260: YES), processing proceeds to S270. When, on the other hand, it is determined that no menu item is selected (S260: NO), the menu manipulation process is terminated without performing S270 and S280.

In S270, a master function is called. This process is performed to call a function of the master display device 10 that corresponds to the selected menu item. In other words, the master display device 10 is operated in accordance with an instruction from the slave display device 20.

In S280, a manipulation screen is displayed. This process is performed in response to the call of a function in S270. In this process, a manipulation screen normally displayed on the master display section 13 of the master display device 10 is displayed on the slave display section 23 of the slave display device 20.

Consequently, the slave display device 20 acts as an information terminal for performing various manipulations in the same manner as the master display device 10.

Figure 6:
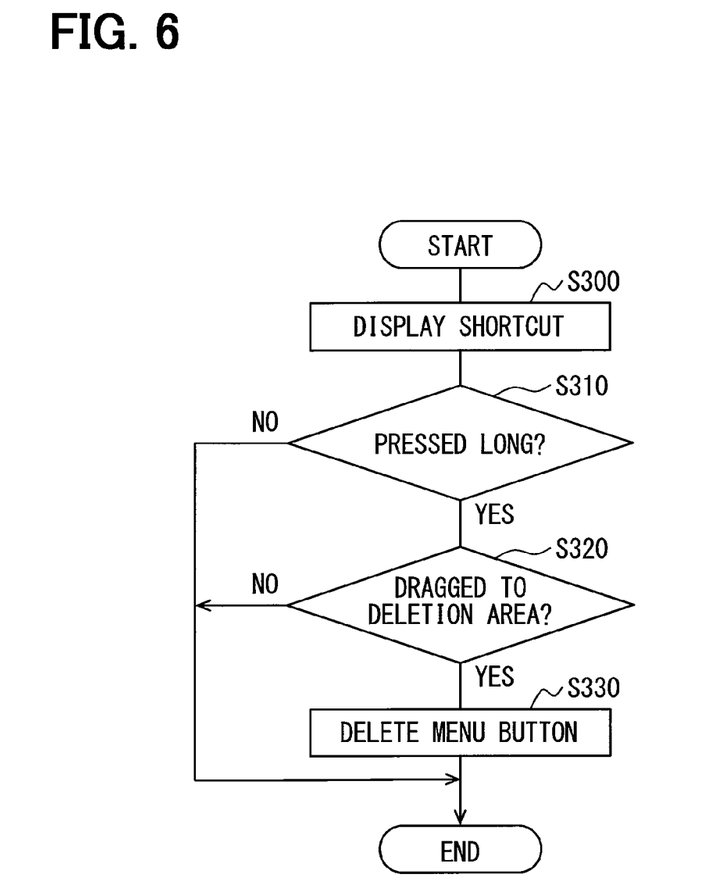
FIG. 6 is a flowchart illustrating a deletion process in the slave display device.

A deletion process performed to delete a menu item from the shortcut menu registered in the slave display device 20 will now be described with reference to the flowchart of FIG. 6. The deletion process is performed by the slave control section 21 each time the user wants to delete a menu item from the shortcut menu and performs a predetermined manipulation.

Firstly, in S300, a shortcut menu is displayed. In this process, the shortcut menu shown, for instance, in FIG. 4B is displayed.

In S310, it is determined whether a menu item is pressed long. When it is determined in S310 that the menu item is pressed long (S310: YES), the process proceeds to S320. When, on the other hand, it is determined that no menu item is pressed long (S310: NO), the deletion process is terminated without performing S320 and S330.

In S320, it is determined whether the pressed menu item is dragged to a deletion area. When an affirmative determination is made in S310, a selected menu item can be dragged. In S320, it is determined whether the menu item is dragged and dropped in the deletion area. Referring, for instance, to FIG. 4B, it is determined whether the menu item is dragged and dropped in a "Delete" area. When it is determined in 320 that the menu item is dragged to the deletion area (S320: YES), the menu item is deleted in S330. Upon completion of S330, the determination process terminates. When, on the other hand, it is determined that the menu item is not dragged to the deletion area (S320: NO), the deletion process is terminated without performing S330.

Figure 5:
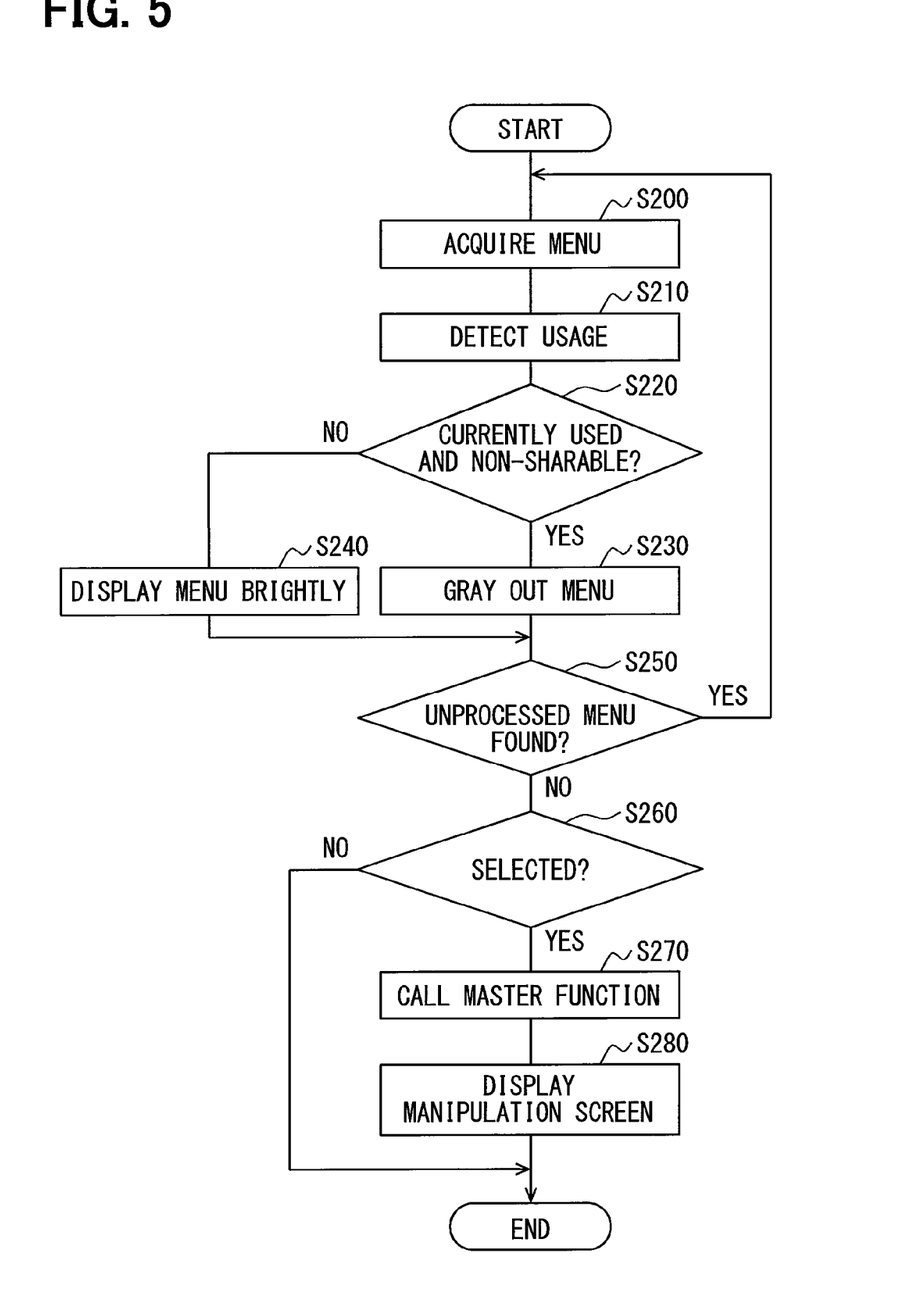
FIG. 5 is a flowchart illustrating a menu manipulation process in a slave display device of the unit manipulation system according to the embodiment of the present disclosure.

In the present embodiment, which has been described in detail above, the slave control section 21 of the slave display device 20 performs the menu manipulation process shown in FIG. 5. More specifically, the slave control section 21 displays the shortcut menu for calling a function of the master display device 10 (S230 and S240; see FIG. 4B). When a menu item is selected from the shortcut menu (S260: YES), the slave control section 21 calls the associated function from the master display device 10 (S270) and displays the manipulation screen (S280).

More specifically, the slave display device 20 includes a call menu display section 21a and a manipulation screen display section 21b. The call menu display section 21a displays a call menu for calling a terminal function. When a call menu displayed by the call menu display section 21a is selected, the manipulation screen display section 21b calls a terminal function of the master display device 10 and causes the slave display section 23 to display a manipulation screen related to the selected call menu.

Consequently, in the slave display device 20, manipulations of the units 15, 16, 17 are permitted in accordance with the manipulation screen on the slave display section 23. This enables the master display device 10 and the slave display device 20 to coordinate with each other. Thus, various manipulations can be performed from the slave display device 20 via the master display device 10.

Further, in the present embodiment, menu items in the shortcut menu are displayed brightly when they are selectable (S240 of FIG. 5) and grayed out when they are not selectable (S230). In other words, the call menu display section 21a displays the call menu in such a manner as to indicate whether it is selectable or not. This clearly indicates manipulations that can be performed by the slave display device 20. The call menu may be displayed in any mode that indicates whether the call menu is selectable or not. For example, an alternative is to display or hide a menu button or display a menu button in different shades. The same holds true for the display of the other buttons.

More specifically, when a function corresponding to a shortcut menu item is being used and non-sharable (S220: YES), the menu item is grayed out (S230). In other words, when a terminal function of the master display device 10 that corresponds to a call menu is being used and cannot be executed in a shared manner, the call menu display section 21a displays the call menu in such a manner as to indicate that it is not selectable. This enables appropriate unit to be manipulated from the slave display device.

Figure 2:
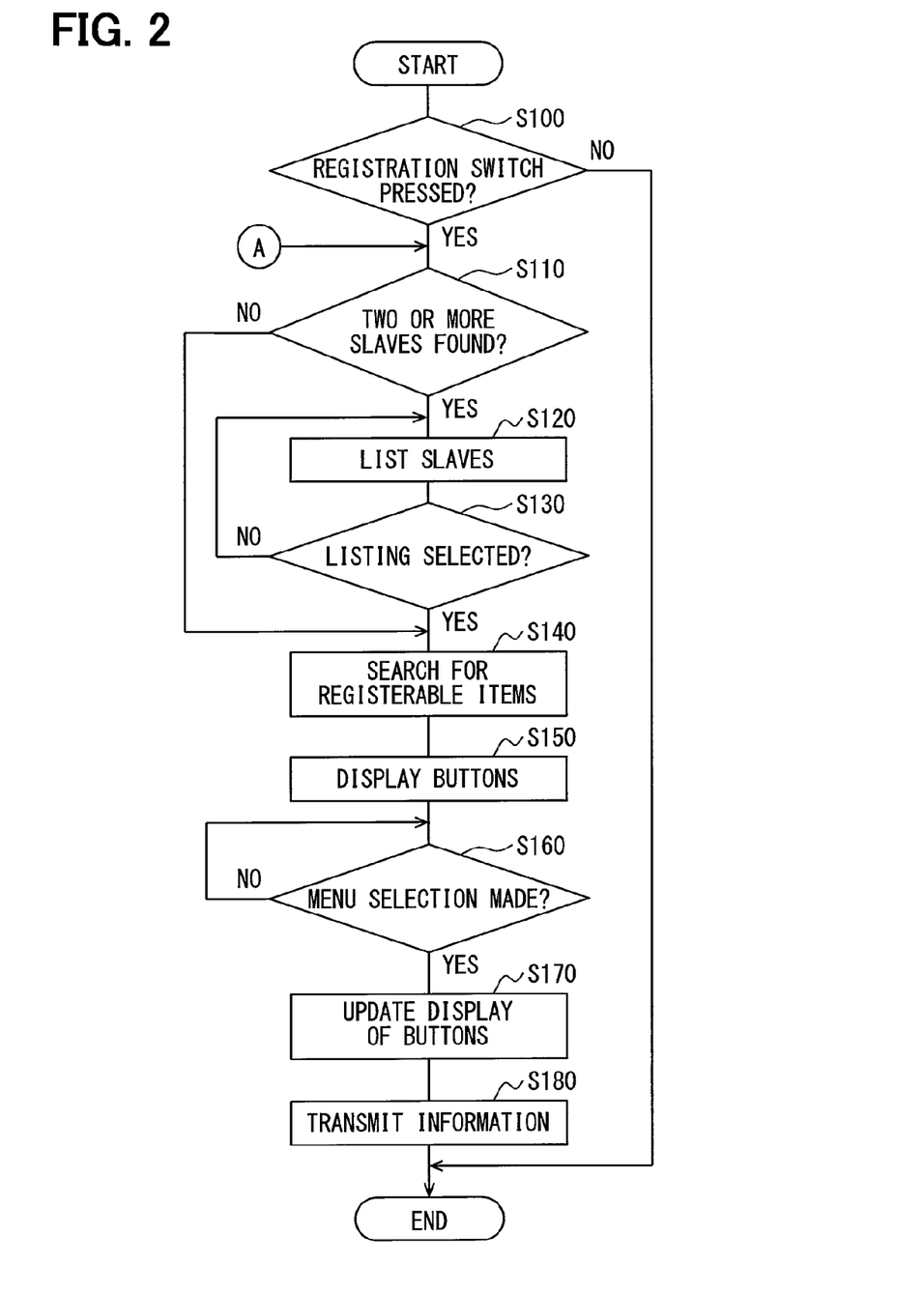
FIG. 2 is a flowchart illustrating a registration process in a master display device of the unit manipulation system according to the embodiment of the present disclosure.

Furthermore, in the present embodiment, the master control section 11 of the master display device 10 performs the registration process shown in FIG. 2. More specifically, to the master control section 11 determines whether the registration switch is pressed (S100). When the registration switch is pressed (S100: YES), the master control section 11 displays a menu button that can be registered as a shortcut menu (S150; see FIG. 3C). When this menu displayed is selected (S160: YES), the master control section 11 updates the display of the button (S170; see FIG. 4A), and informs the slave display device 20 of the selection of the menu (S180). Thus, the shortcut menu is registered. In other words, the master control section 11 includes a registration menu display section 11a and a determination section 11b. The registration menu display section 11a displays a registration target menu that can be registered as a call menu. When a registration target menu displayed by the registration menu display section 11a is selected, the determination section 11b determines the selected registration target menu as a call menu. Consequently, a menu for calling a function of the master display device 10 can easily be registered in the slave display device 20.

In the above instance, when the registration switch is pressed (S100 of FIG. 2: YES), the master control section 11 brightly displays a menu button that can be registered as a shortcut menu (S150; see FIG. 3C). In other words, the registration menu display section 11a displays a registration target menu in such a manner as to indicate whether it is selectable or not. More specifically, the registration menu display section 11a displays a registration target menu registerable as a call menu in such a manner as to indicate that it is selectable. This makes it easy to recognize a menu that calls a function of the master display device 10 and can be registered in the slave display device 20.

Moreover, in the present embodiment, it is determined whether there are two or more slave display devices 20 in the registration process shown in FIG. 2 (S110 of FIG. 2). When it is determined that there are two or more slave display devices 20 (S110: YES), the slave display devices 20 are listed on display (S120 and S130). In other words, when there are a plurality of the slave display devices 20, the registration menu display section 11*a* lists the plurality of the slave display devices 20 and permits the user to select one of the slave display devices 20 to which a call menu is to be registered. Consequently, even when there is the plurality of the slave display devices 20, a shortcut menu can be created with relative ease.

In the above instance, the slave display device 20 to which the shortcut menu is to be registered is displayed brightly (S120 of FIG. 2; see FIG. 3B). In other words, the registration menu display section 11*a* displays each slave display device 20, to which a call menu can be registered, in such a manner as to indicate whether it is selectable or not. More specifically, the registration menu display section 11*a* displays the slave display device 20, to which a call menu can be registered, in such a manner as to indicate that it is selectable. Consequently, even when there are the plurality of the slave display devices 20, the slave display devices 20 to which a shortcut menu can be registered are obvious at a glance.

Besides, in the present embodiment, it is determined, after the display of a shortcut menu (S300 of FIG. 6; see FIG. 4B), whether a menu button is pressed long (S310). When the menu button is dragged to the deletion area after being pressed long (S310: YES, S320: YES), the menu button is deleted (S330). In other words, the slave display device 20 includes a deletion section 21*c* that deletes a call menu. This makes it easy to not only register a shortcut menu but also delete it.

The present disclosure is not limited to the above-described embodiment and may be implemented in various alternative embodiments as far as they fall within the technical scope of the present disclosure.

Figure 7:
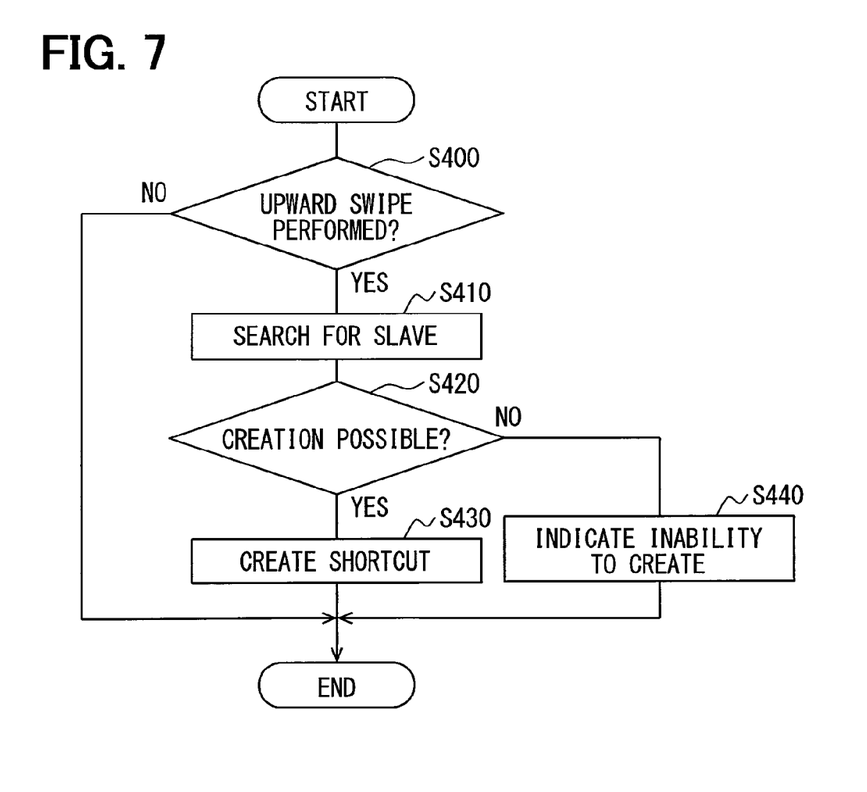
FIG. 7 is a flowchart illustrating an example of the registration process in the master display device according to another embodiment of the present disclosure.

(1) A registration process shown in the flowchart of FIG. 7 may be adopted and performed instead of the registration process of the above-described embodiment shown in FIG. 2. Similarly to the registration process performed in the above-described embodiment, the registration process shown in FIG. 7 is performed by the master control section 11 of the master display device 10. This registration process is performed when a menu that can be registered in the slave display device 20 as a shortcut menu is displayed.

Firstly, in S400, it is determined whether an upward swipe has been performed. The upward swipe is performed by touching a menu button on a screen with a finger and sliding the finger upward in such a manner as to move the menu button upward toward the top of the screen. When it is determined in S400 that an upward swipe has been performed (S400: YES), the process proceeds to S410. When, on the other hand, it is determined that no upward swipe has been performed (S400: NO), the registration process is terminated without performing subsequent process.

In S410, a slave display device 20 is searched for. This process is performed to search for a slave display device 20 connected to the master display device 10.

Next, in S420, it is determined whether a shortcut menu can be created in the slave display device 20 found in S410. When it is determined in S420 that a shortcut menu can be created (S420: YES), the process proceeds to S430. In S430, information about the shortcut menu is transmitted to the slave display device 20. Upon completion of S430, the registration process terminates. When, on the other hand, it is determined that a shortcut menu cannot be created (S420: NO), the process proceeds to S440. In S440, an animation or the like is displayed to indicate that a shortcut menu cannot be created. Upon completion of S440, the registration process terminates. The inability to create a shortcut menu may be indicated, for instance, by causing the menu button moved upward toward the top of the screen to strike against the top of the screen and fall downward.

In other words, when a registration target menu is selected by performing a predetermined manipulation, the determination section 11*b* searches for a slave display device 20 to which a call menu can be registered. When the call menu can be registered to the slave display device 20, the registration target menu is determined as a call menu. Consequently, a shortcut menu can be registered as a call menu by performing a very intuitive manipulation.

(2) In the above-described embodiment, the registration process shown in FIG. 2 is performed by the master control section 11 of the master display device 10. Alternatively, however, shortcut menu registration may be conducted by the slave display device 20.

Figure 8:
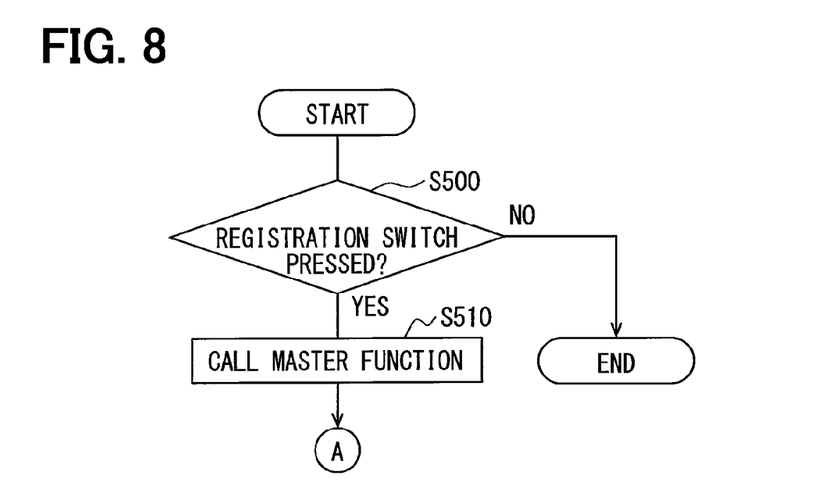
FIG. 8 is a flowchart illustrating an example of the registration process in the slave display device according to another embodiment of the present disclosure.

In this instance, as shown in FIG. 8, firstly, it is determined firstly in S500 whether the registration switch on the slave display section 23 of the slave display device 20 is pressed. Whether the on-screen registration switch is pressed is determined in accordance with a signal from the slave manipulation section 22, which is a touch panel formed integrally with the slave display section 23. When it is determined in S500 that the registration switch is pressed (S500: YES), the process proceeds to S510. In S510, a master function is called. Upon completion of S510, the process proceeds to S110 of FIG. 2. The master control section 11 then performs processing of S110 and after. However, the registration process progresses through the slave manipulation section 22 and the slave display section 23 as if the registration process is performed by the slave control section 21. When, on the other hand, it is determined that the registration switch is not pressed (S500: NO), the registration process terminates.

Consequently, increased user-friendliness is provided because a shortcut menu can be created as a call menu by manipulating the slave display device 20.

Also in the above instance, the master control section 11 functions as the registration menu display section 11*a* and the determination section 11*b*, and such a function is called from the slave display device 20, similarly to the above-described embodiment. However, an alternative configuration may be employed so that the slave control section 21 of the slave display device 20 functions as the registration menu display section and the determination section.

(3) In the above-described embodiment, it is determined whether a menu button is pressed long (S310 of FIG. 6) in the deletion process for deleting a shortcut menu. When it is determined that a menu button is pressed long (S310: YES), it is determined in S320 whether the menu button is dragged to the deletion area.

However, the above-described manipulation is merely an example. An alternative manipulation procedure may be performed for deletion purposes. For example, an alternative is to determine whether the cursor is placed over a menu button, confirm that the cursor is placed over the menu button, and delete the menu button by pressing a button for issuing a deletion instruction. This method also makes it easy to delete a shortcut menu.

While the present disclosure has been described in conjunction with the embodiments thereof, it is to be understood that the present disclosure is not limited to the disclosed embodiments or constructions. The present disclosure is intended to cover various modifications and equivalent arrangements. In addition, other combinations and configurations, including more, less or only a single element, are also within the spirit and scope of the present disclosure.

The invention claimed is:

1. A unit manipulation system comprising:
a master display device having a terminal function for manipulating at least one unit; and
a slave display device that establishes data communication with the master display device and calls the terminal function of the master display device to enable manipulation of the at least one unit from a manipulation section of the slave device, through the master display device;
wherein the slave display device includes:
a call menu display section that displays a call menu for calling the terminal function, and
a manipulation screen display section that, when the call menu displayed by the call menu display section is selected, calls the terminal function of the master display device and causes a slave display section to display a manipulation screen corresponding to the call menu,
wherein the master display device includes:
a registration menu display section that displays a registration target menu including a plurality of menu items as target items to be registered to the slave display device as the call menu, and
a determination section that, when at least one of the menu items of the registration target menu is selected, determines the selected menu item as the call menu; and
wherein the registration menu display section displays each of the plurality of menu items in such a manner as to indicate that a menu item that can be registered to the slave display device is selectable and a menu item that cannot be registered to the slave display device is not selectable.

2. The unit manipulation system according to claim 1, wherein the call menu display section displays the call menu in such a manner as to indicate whether the call menu is selectable or not.

3. The unit manipulation system according to claim 2, wherein when the terminal function of the master display device that corresponds to the call menu is being used and cannot be executed in a shared manner, the call menu display section displays the call menu in such a manner as to indicate that the call menu is not selectable.

4. The unit manipulation system according to claim 1, wherein, when a plurality of the slave display devices exist, the registration menu display section lists the plurality of the slave display devices and encourages a user to select a slave display device to which the call menu is to be registered.

5. The unit manipulation system according to claim 4, wherein the registration menu display section displays the slave display device, to which the call menu can be registered, in such a manner as to indicate whether the slave display device is selectable or not.

6. The unit manipulation system according to claim 5, wherein the registration menu display section displays the slave display device, to which the call menu can be registered, in such a manner as to indicate that the slave display device is selectable.

7. The unit manipulation system according to claim 1, wherein, when at least one of the menu items of the registration target menu is selected by a predetermined manipulation, the determination section searches for a slave display device to which the menu item selected can be registered as the call menu; and
when the menu item selected can be registered to the slave display device as the call menu, the determination section determines and registers the menu item selected as the call menu to the slave display device.

8. The unit manipulation system according to claim 1, wherein the slave display device includes a deletion section that deletes the call menu.

9. The unit manipulation system according to claim 1, wherein
among the plurality of menu items, the menu item that can be registered is an item that has not yet been registered to the slave display device.

10. The unit manipulation system according to claim 1, wherein the registration menu display section and the determination section are included in a master control section that is configured as a computer including a central processing unit (CPU), a read only memory (ROM), a random access memory (RAM), an input/output (I/O), and a bus line connecting these components,
wherein the call menu display section and the manipulation screen display section are included in a slave control section that is configured as a computer including a central processing unit (CPU), a read only memory (ROM), a random access memory (RAM), an input/output (I/O), and a bus line connecting these components,
wherein the manipulation section of the slave device is configured as a touch panel that is layered on the top of an electronic visual display, and
wherein the slave display section is configured as an electronic visual display.

11. A slave display device that has a manipulation section and a slave display section, establishes data communication with a master display device having a terminal function for manipulating at least one unit, and calls the terminal function of the master display device to enable manipulation of the unit from the manipulation section through the master display device, the slave display device comprising:
a slave control section that includes:
a call menu display section that displays a call menu for calling the terminal function, and
a manipulation screen display section that, when the call menu displayed by the call menu display section is selected, calls the terminal function of the master display device and causes the slave display section to display a manipulation screen corresponding to the call menu,
wherein the master display device includes:
a registration menu display section that displays a registration target menu including a plurality of menu items as target items to be registered to the slave display device as the call menu, and
a determination section that, when at least one of the menu items of the registration target menu is selected, determines the selected menu item as the call menu, and
wherein the registration menu display section displays each of the plurality of menu items in such a manner as to indicate that a menu item that can be registered is selectable and a menu item that cannot be registered is not selectable.

12. The slave display device according to claim 11, wherein among the plurality of menu items, the menu item that can be registered is an item that has not yet been registered to the slave display device.

13. The slave display device according to claim 11, wherein the registration menu display section and the determination section are included in the slave control section.

14. The slave display device according to claim 11, wherein the slave control section calls a master control section of the master display device and executes the registration menu display section and the determination section in the slave control section.

15. The slave display device according to claim 11, wherein the registration menu display section and the determination section are included in a master control section that is configured as a computer including a central processing unit (CPU), a read only memory (ROM), a random access memory (RAM), an input/output (I/O), and a bus line connecting these components,
wherein the slave control section is configured as a computer including a central processing unit (CPU), a read only memory (ROM), a random access memory (RAM), an input/output (I/O), and a bus line connecting these components, and
wherein the manipulation section of the slave device is configured as a touch panel that is layered on the top of an electronic visual display, and
wherein the slave display section is configured as an electronic visual display.

16. A master display device that has a terminal function for manipulating at least one unit and is used with a slave display device that establishes data communication with the master display device and calls the terminal function of the master display device to enable manipulation of the unit from a manipulation section of the slave display device through the master display device,
wherein the slave display device includes a call menu display section that displays a call menu for calling the terminal function, and a manipulation screen display section that, when the call menu displayed by the call menu display section is selected, calls the terminal function of the master display device and causes a slave display section to display a manipulation screen corresponding to the call menu, the master display device comprising:
a master control section that includes:
a registration menu display section that displays a registration target menu including a plurality of menu items as target items to be registered to the slave display device as the call menu, and
a determination section that, when at least one of the menu items of the registration target menu displayed by the registration menu display section is selected, determines the selected menu item as the call menu,
wherein the registration menu display section displays each of the plurality of menu items in such a manner as to indicate that a menu item that can be registered to the slave display device is selectable and a menu item that cannot be registered to the slave display device is not selectable.

17. The master display device according to claim 16, wherein
among the plurality of menu items, the menu item that can be registered is an item that has not yet been registered to the slave display device.

18. The master display device according to claim 16, wherein the master control section is configured as a computer including a central processing unit (CPU), a read only memory (ROM), a random access memory (RAM), an input/output (I/O), and a bus line connecting these components,
wherein the call menu display section and the manipulation screen display section are included in a slave control section that is configured as a computer including a central processing unit (CPU), a read only memory (ROM), a random access memory (RAM), an input/output (I/O), and a bus line connecting these components,
wherein the manipulation section of the slave device is configured as a touch panel that is layered on the top of an electronic visual display, and
wherein the slave display section is configured as an electronic visual display.

\* \* \* \* \*